United States Patent [19]

Tedesco

[11] Patent Number: 4,510,549

[45] Date of Patent: Apr. 9, 1985

[54] POWER SUPPLY VOLTAGE MONITOR AND CONTROL SYSTEM

[75] Inventor: Jack Tedesco, Manhattan Beach, Calif.

[73] Assignee: Econolite Control Products, Inc., Anaheim, Calif.

[21] Appl. No.: 602,684

[22] Filed: Apr. 23, 1984

[51] Int. Cl.³ .............................................. H02H 3/24
[52] U.S. Cl. .................... 361/86; 307/361; 340/663; 340/931; 361/92
[58] Field of Search .................. 361/92, 86; 340/931, 340/663; 307/130, 361

[56] References Cited

U.S. PATENT DOCUMENTS

| | | | |
|---|---|---|---|
| 3,911,360 | 10/1975 | Kimzey | 340/663 |
| 3,979,657 | 9/1976 | Yorksie | 340/663 X |
| 4,338,596 | 7/1982 | Huber et al. | 340/663 X |
| 4,401,969 | 8/1983 | Green et al. | 340/931 X |

Primary Examiner—Reinhard J. Eisenzopf
Attorney, Agent, or Firm—Edward A. Sokolski

[57] ABSTRACT

A power supply particularly for use with a traffic control system has a voltage monitoring and control system which continually monitors the line voltage fed to the traffic control system and automatically turns off the power when the voltage drops below a predetermined minimum for a predetermined time period or provides a warning signal should the voltage drop below a higher second predetermined minimum for a predetermined time interval. In the event that the voltage returns to a predetermined acceptable value for a predetermined time period, the power is automatically restored and the warning signal discontinued. The monitoring system includes sensors operative in response to each of the control parameters which operate in conjunction with logical control circuitry to effect the desired controls.

4 Claims, 3 Drawing Figures

POWER SUPPLY VOLTAGE MONITOR AND CONTROL SYSTEM

This invention relates to monitoring and control systems for electrical power supplies, and more particularly to such a system for automatically shutting down the power and providing a warning signal should the power supply voltage fall below certain predetermined values.

In the operation of traffic control systems suitable for controlling traffic signal lights, it is necessary that the supply voltage to the traffic control devices have at least a predetermined minimum value, typically of the order of 85-95 volts AC. This is so because with low voltages, control relays may start to chatter giving erratic signal operation which could provide an erroneous flashing indication along with a rather dim signal. Other erratic and erroneous operations can also occur with a low supply voltage. In order to avoid such erroneous indications, during "brown outsA" or other situations causing low supply voltage, it is desirable to shut down the equipment under such conditions. It is further to be noted that low voltage operation along with relay chattering causes the generation of noise in the system which could cause failure of certain system components. It is also essential that when the voltage returns to normal, the system operation be restored as rapidly as possible so that there is a minimum interruption to the control of traffic.

Systems have been developed in the prior art to cut off a supply power when voltage goes below a predetermined value for predetermined periods of time. Such systems are described in U.S. Pat. No. 4,368,499 to Stifter; U.S. Pat. No. 1,901,628 to Brainard; U.S. Pat. No. 3,475,061 to Skeinkamp et al.; U.S. Pat. No. 3,623,131 to Russell; U.S. Pat. No. 4,331,996 to Matsko et al.; U.S. Pat. No. 3,740,738 to Kosanovich et al; and U.S. Pat. No. 4,060,843 to Bost. None of these prior art systems, however, provides means for turning the power off automatically should it fall below a first predetermined value for a first period of time and automatically turning on the power should the line voltage reach a second higher value for a predetermined time period. Further, none of these systems provides a warning signal should the voltage fall to a third voltage higher than the first but lower than the second for a predetermined time period, with this warning signal being terminated if the voltage should rise to the higher voltage. The system of the present invention which provides the just-mentioned more sophisticated control affords distinct advantages over the prior art; particularly when used in conjunction with a traffic control system where it is essential that if the supply power falls below a level at which the control equipment can reliably operate that the intersection be placed in a flashing operation. Also, it is essential that if the control of traffic must be interrupted that this be for the minimum time possible.

It is therefore an object of the invention to provide an improved control for monitoring and controlling the supply voltage for a traffic control system.

It is a further object of this invention to provide a voltage monitoring and power supply control for a traffic control system wherein power is turned off when the voltage reaches a first predetermined "low" value for a predetermined period and turned on again should the voltage reach a second predetermined voltage higher than the first for a predetermined time period and wherein a flashing signal operation of the system is provided should the voltage reach a third predetermined voltage between the first and second voltages.

Other objects of the invention will become apparent as the description proceeds in connection with the accompanying drawings of which:

Briefly described, the system of the invention is as follows.

Separate monitors are provided for each of the critical voltages to be monitored. In the preferred embodiment, this includes a first monitor for sensing when the voltage reaches a first predetermined low value as compared with normal operating voltage which is too low for normal operation, a second monitor for sensing when the voltage reaches a second predetermined value higher than the first value, and a third monitor for sensing when the voltage reaches a third predetermined value between the first and second values. When the voltage reaches the first predetermined low value for a predetermined time period, the power is automatically turned off so that the traffic control system is rendered completely inoperative. Should the voltage reach the second predetermined value which is higher than the first for a predetermined time interval, as sensed by the monitor and its associated logical control circuitry, the power is again restored to enable full operation of the system. If the voltage should reach the predetermined intermediate value between the first (low) value and the second (higher) value, for a predetermined time interval as determined by logical control circuitry associated with the monitor in question, a control signal is generated which, in the case of a traffic control system, is employed to effect a flashing operation of the signal lights. Should the voltage go from the intermediate value to the higher value, for a predetermined time interval, normal operation of the system is restored.

Figure 1:
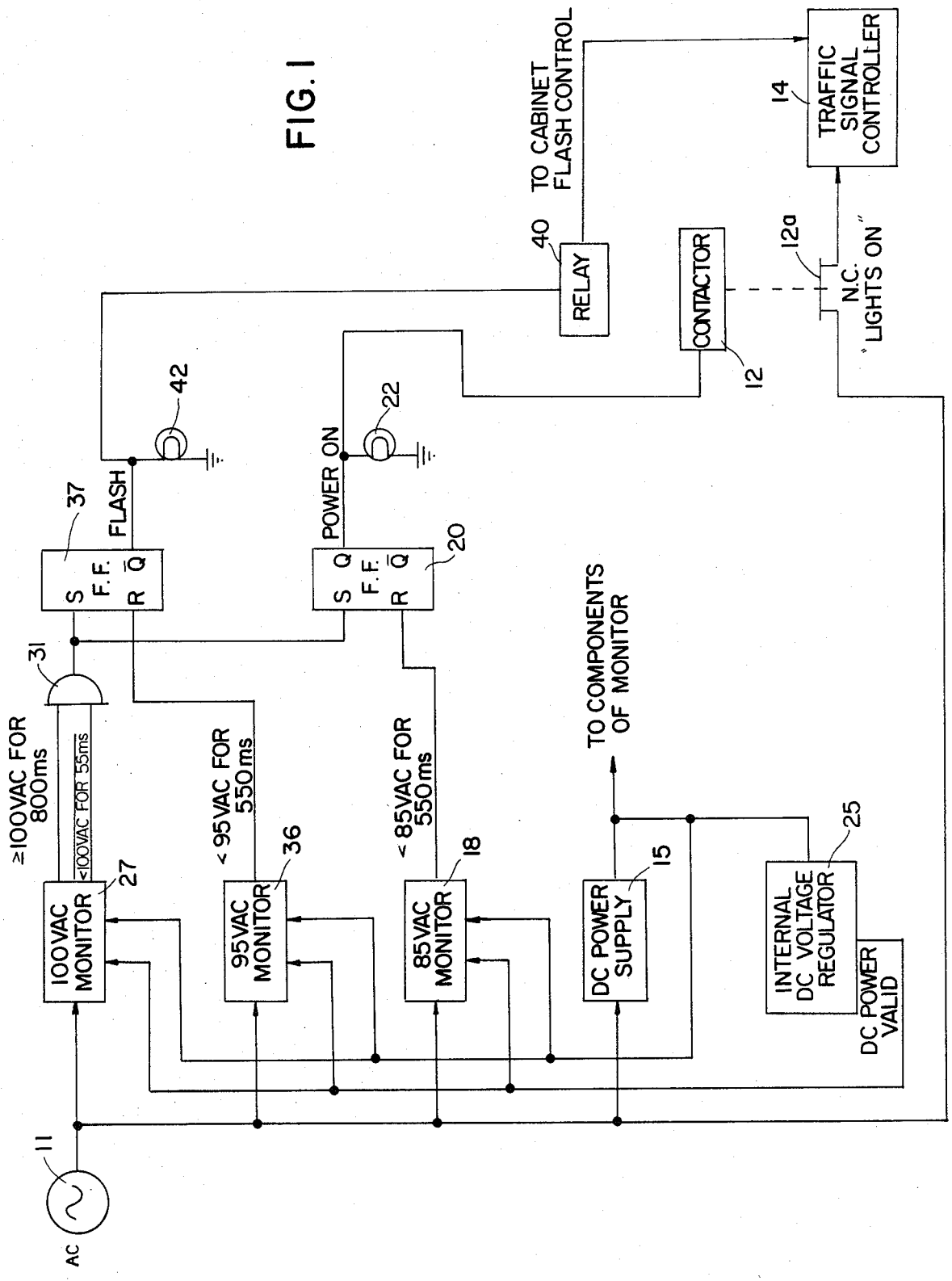
FIG. 1 is functional block diagram of the system of the invention.

Referring now to FIG. 1, a functional block diagram of the system of the invention as adapted for a traffic signal controller is illustrated.

Voltage is supplied from AC power source 11 through contactor switch 12 to traffic signal controller 14. When the AC supply voltage is above 95 volts and when DC power supplied to the components of the system of the invention from DC power supply 15 is also present, the traffic signal controller operates normally. Should the AC supply voltage drop below 85 volts for at least 550 milliseconds as determined by 85-volt AC monitor 18, the monitor provides an output to flip-flop 20 which actuates the "R" (reset) terminal of the flip-flop which provides an output at its "Q" terminal which actuates contactor 12 to remove power from traffic signal controller 14. At the same time the "lights on" indicator 22 is turned off. A similar result is obtained if there is not proper output from DC power supply 15 as determined by Internal DC Voltage Monitor 25, this monitor providing a "clear" signal to voltage monitor 18 which keys monitor 18 to maintain an output at the Q terminal of flip-flop 20 so as to remove power from the traffic signal controller.

The lights will remain in the "off" condition until and unless the 100 volt AC monitor 27 senses the presence of a level of 100 volts or greater for at least 800 milliseconds. When such a condition is sensed, a signal is fed from monitor 27 through AND gate 31 to the "S" (set) terminal of flip-flop 20 which returns the flip-flop to its "set" state which operates to close the contacts 12a of contactor 12 and restore the operation of indicator light 22. This operates to restore normal operation of the traffic signal controller 14. AND gate 31 also receives a signal from 100 volt AC monitor 27 which permits operation of the gate should the voltage drop below 100 volts for less than 55 milliseconds which could be occasioned by a sudden surge and not representing the absence of 100 volts on an average basis.

Should the voltage drop below 95 volts AC for 550 milliseconds, such a condition is sensed by 95 volt AC monitor 36, this monitor providing an output to the "R" (reset) terminal of flip-flop 37. The flip-flop provides an output from its "Q" terminal under such conditions which actuates relay 40 which controls the flashing operation of traffic signal controller 14, causing the signal lights to go into a flashing operation. With such flashing operation, flash indicator lamp 42 is actuated. In the event that the voltage should return to "normal" (i.e. 100 volts or greater) for 800 milliseconds, as sensed by 100 volt AC monitor 27, an output is fed from AND gate 31 to the "S" (set) terminal of flip-flop 37 to terminate the flashing signal light operation and return operation of the system to normal.

DC power supply 15 provides power for the components for each of monitors 18, 27, and 36. The output of internal DC voltage mirror 25 controls each of monitors 27, 36 and 18 such that if the DC voltage is ever below a predetermined minimum value, the system is kept shut down until and unless that minimum value is again reached.

Figure 2A:
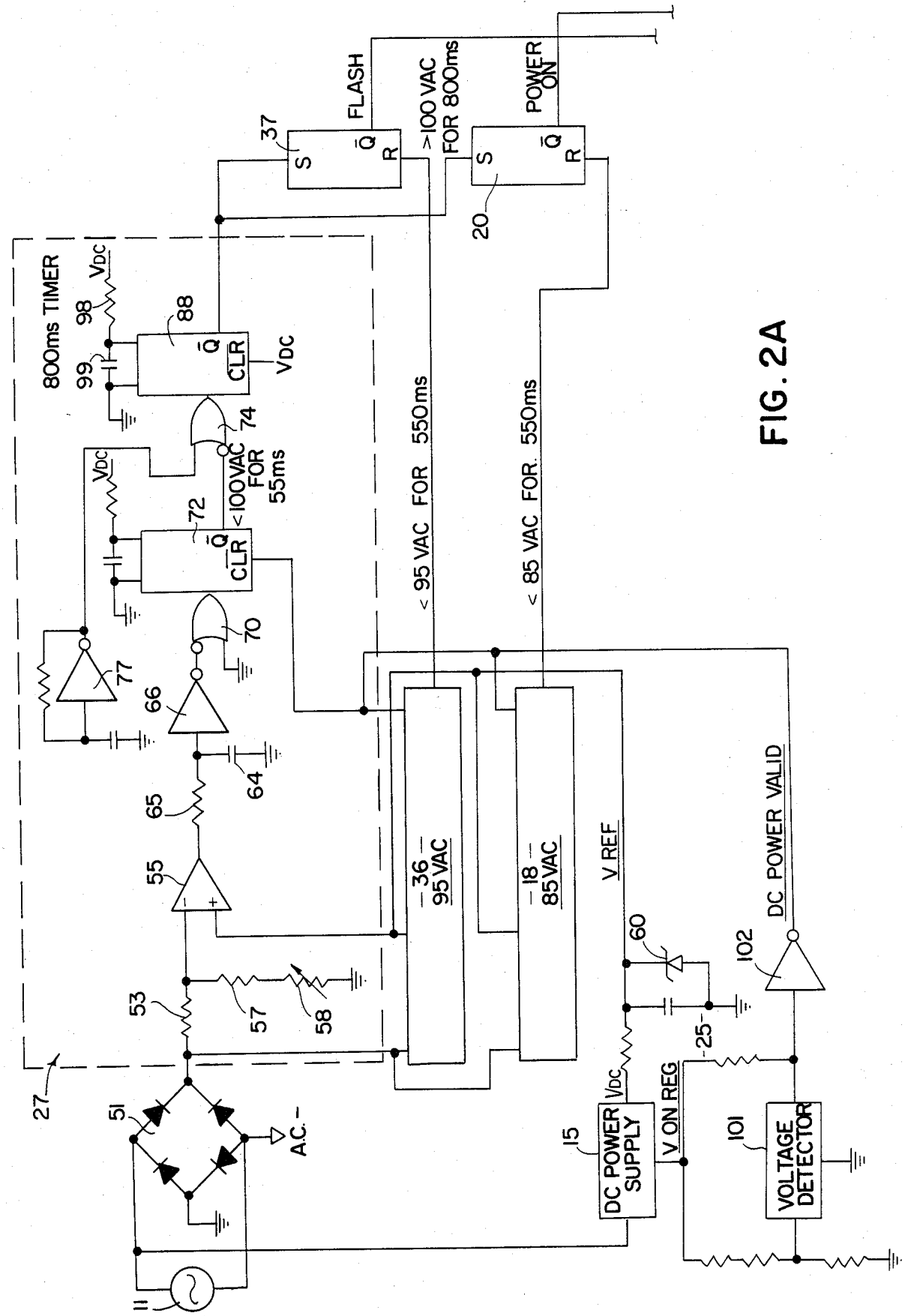
FIGS. 2A and 2B are a schematic diagram illustrating the monitoring and control circuitry of a preferred embodiment of the invention.
Figure 2B:
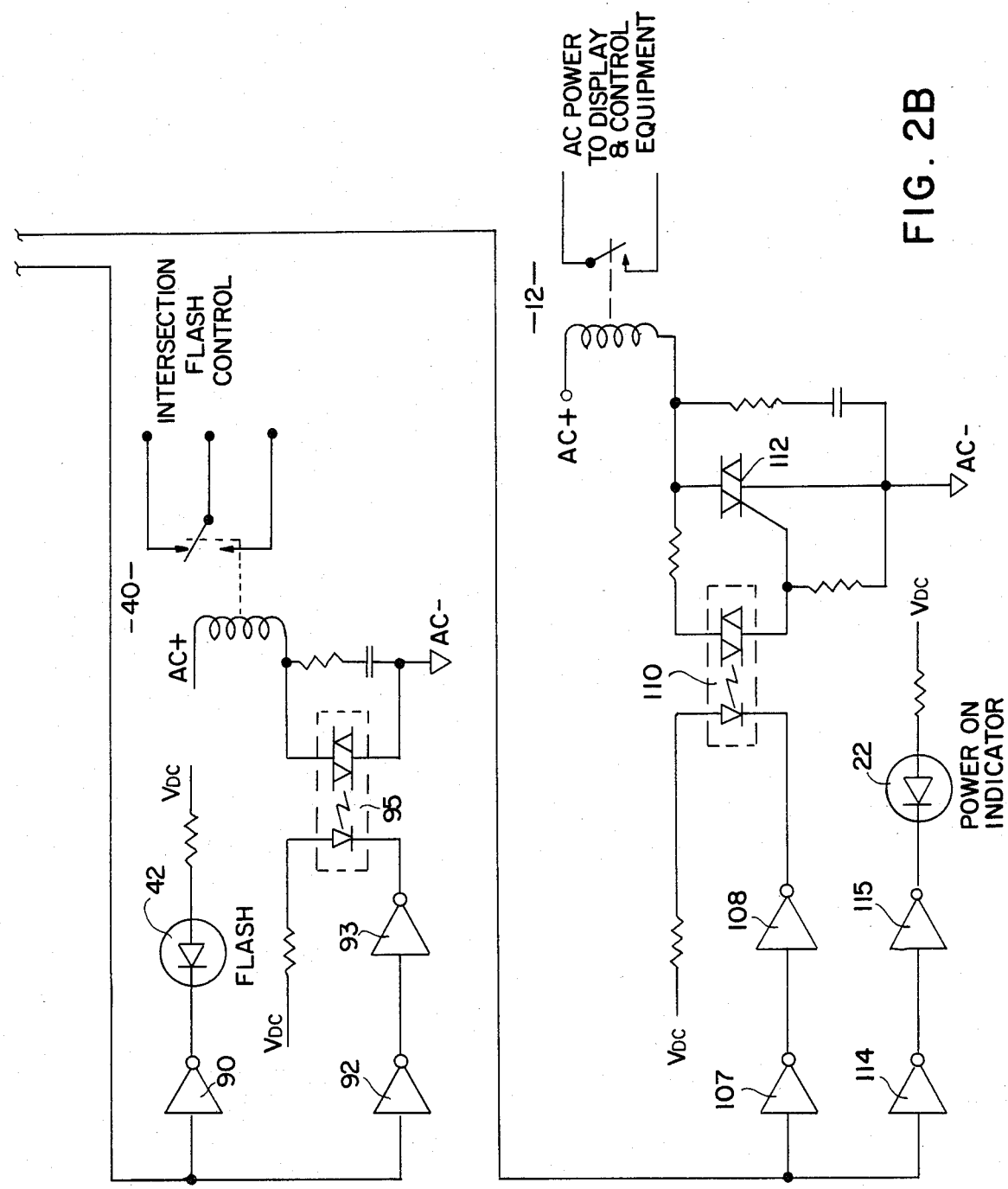

Referring now to FIGS. 2A and 2B, a schematic drawing of a preferred embodiment of the invention is shown. The power from AC power line 11 is rectified by means of bridge rectifier 51, this DC output representing the value of the AC output being fed to each of voltage monitors 27, 36, and 18. The voltage monitors are substantially identical except for the timing involved in each instance and therefore only one of these circuits, that for the 100 volt monitor 27, will be described in detail.

The output of bridge rectifier 51 is fed through a voltage divider formed by resistors 53, 57 and 58 to the "negative" inputs of comparator circuit 55, resistor 58 being variable so as to enable the calibration of the comparator. Comparator circuit 55 may be an IC such as a National type LM 324. A reference voltage is fed to the "positive" input of differential amplifier 55 from DC power supply 15, this power supply having a zener diode 60 in its output for providing a precise reference voltage. It is to be noted that DC power supply 15 is also used to supply power to the various components for the monitor system. Comparator circuit 55 is calibrated and operates with its reference voltage input so that whenever the AC voltage on the line is above 100 volts, a pulsing output is provided therefrom through a noise filter formed by resistor 65 and capacitor 64 to Schmitt trigger-inverter 66. The output of the Schmitt Trigger is fed to the trigger gate 70 of timer circuit 72. The output of the trigger gate 70 is fed to timer circuit 72 which is a 55 millisecond timer which may comprise a retriggerable one-shot multivibrator such as a type CD4538B IC. When the output of gate 70 indicates that the AC line voltage is 100 volts or more and is not less than 100 volts for a time period of more than 55 milliseconds, timer 72 provides an output signal to the trigger gate 74 of timer circuit 88. Schmitt trigger 77 forms an oscillator, the output of which is fed to trigger gate 74. This oscillator operates to provide a triggering signal for timer 88 which may be a retriggerable one-shot multivibrator with a timing circuit formed by resistor 98 and capacitor 99. This triggering signal is passed through trigger gate 74 to timer 88 when there is not an output from timer 72 (indicative of a line voltage of 100 or more volts which is not interrupted for more than 55 milliseconds). In the event that 100 volts or more is on the AC line for a period of at least 800 milliseconds, timer 88 will provide an output to flip-flops 20 and 37 which sets these flip-flops which, as explained previously in connection with FIG. 1, operates to restore power to the traffic control system in the event that the system has been disabled due to the monitoring of a voltage below 85 volts AC by voltage monitor 18.

The output of flip-flop 37 is fed through amplifier 90 to flash indicator 42 which indicates when a flashing mode of operation is in effect and is disabled in response to the output of timer 88. At the same time the output of flip-flop 37 is fed through amplifiers 92 and 93 to optical isolator 95 which may comprise an integrated circuit which includes an LED and a triac such as a Motorola MOC3011. The output of optical isolator 95 is used to control flasher relay 40 to either effect or cease flashing operation of the traffic lights, as the case may be. When the voltage is 100 volts or more, the output of flip-flop 37 operates to drive the optical isolator 95 so as to maintain the flasher relay in the "open" condition.

Voltage detector 101 operates to provide an output to amplifier 102 when the voltage output of DC power supply 15 is above a predetermined value. The output of amplifier 102 is fed to each of the timers 72, etc., of voltage monitors 27, 36 and 18 to "clear" the operation of these timers, when proper DC is not present, thereby maintaining an output at the Q terminals thereof such as to keep power relay 12 open. In this manner, the validity of the output of the DC supply is also made a condition for the operation of the system and this prevents false operation should there not be a proper DC supply for both reference voltage and operation of the circuit components.

The Q output of flip-flop 20, which must be in the "set" condition for operation for the traffic controller, is fed through amplifiers 107 and 108 to optical isolator 110 (LED-triac). Optical isolator 110 provides an output for actuating triac 112 which in turn operates contactor relay 12 to provide power to the traffic controller. Also provided for flip-flop 20 through amplifiers 114 and 115 is a signal for actuating "power on" indicator 22.

As already noted, 95-volt monitor 36 and 85-volt monitor 18 have the same circuitry as that of 100-volt monitor 27 except for the timing characteristics of their timers, these timers corresponding in function to timer 72 of monitor 27. Also for monitors 36 and 18, the 800 millisecond timer 88 of monitor 27 is not employed, the outputs of the timers corresponding to timer 72 being used to actuate flip-flops 37 and 20 respectively.

While the invention has been described and illustrated in detail, it is to be clearly understood that this is intended by way of illustration and example only and is not to be taken by way of limitation, the spirit and scope of the invention being limited only by the terms of the following claims.

I claim:

1. A voltage monitoring and control system for monitoring the voltage output of a power source for an electrically operative device and providing predetermined operative controls for said device when said voltage is not within a predetermined "normal" range or returns to said "normal" range comprising a first voltage monitor for sensing when the voltage goes below a first predetermined value below said "normal" range for a predetermined minimum time and providng a first output signal under such conditions, a second voltage monitor for sensing when the voltage reaches a second predetermined value within said "normal" range for a predetermined minimum time and providng a second output signal under such conditions, a third voltage monitor for sensing when the voltage goes below a third predetermined value between said first and second values and outside said "normal" range for a predetermined minimum time and providing a third output signal under such conditions, first control means operatively connected to said first monitor and responsive to said first output signal for disconnecting said power source from said electrically operative device, second control means operatively connected to said second monitor and responsive to said second output signal for reconnecting said power source to said device, third control means operatively connected to said third monitor and responsive to said third output signal for initiating a predetermined mode of operation of said device, a power supply for supplying a reference and operative voltage for said system, and a fourth voltage monitor for sensing the voltage output of said last mentioned power supply, said first, second and third voltage monitors each being connected to said fourth voltage monitor to receive a reference voltage and a validating signal indicating that the output of said last mentioned power supply has at least a predetermined minimum value, said first control means operating to disconnect the power when the validating signal is not present.

2. The system of claim 1 wherein said system is a traffic control system for controlling the operation of traffic signal lights, said predetermined mode of operation initiated by said third control means being a flashing operation of said signal lights.

3. A voltage monitoring and control system for monitoring the voltage output of a power source for traffic control system for controlling the operation of traffiac signal lights and providing predetermined operative controls for said traffic control system when the voltage is not within a predetermined "normal" range or returns to said range comprising a first voltage monitor for sensing when the voltage goes below a first predetermined value below said "normal" range for a predetermined time and providing a first output signal under such conditions, a second voltage monitor for sensing when the voltage reaches a second predetermined value within said "normal" range for a predetermined minimum time and providing s second output signal under such conditions, a third voltage monitor for sensing when the voltage goes below a third predetermined value between said first and second values and outside said "normal" range for a predetermined minimum time and providing a third output signal under such conditions, first control means operatively connected to said first monitor and responsive to said first output signal for disconnecting said power source from said traffic control system, second control means operatively connected to said second monitor and responsive to said second output signal for reconnecting said power source to said traffic control system, third control means operatively connected to said third monitor and responsive to said third output signal for initiating flashing operation of the signal lights by said traffic control system;

a power supply for supplying reference and operative voltages for said system, and a fourth voltage monitor for sensing the voltage output of said last mentioned power supply, said first, second and third voltage monitors each being connected to said fourth voltage monitor to receive a reference voltage and a validating signal indicating that the output of said last mentioned power supply has at least the predetermined minimum value, said first control means operating to disconnect the power when the validating signal is not present.

4. The system of claim 3 wherein said first predetermined value is 85 1 volts AC, the second predetermined value is 100 volts AC, and the third predetermined value is 95 volts AC.

* * * * *